May 26, 1936.  E. M. HECKMAN  2,041,763
CLEANSING FLUID FILTRATION
Filed Feb. 27, 1934
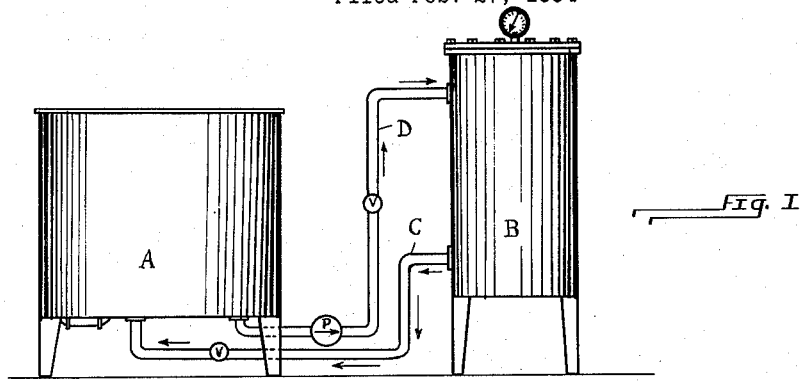
Fig. I
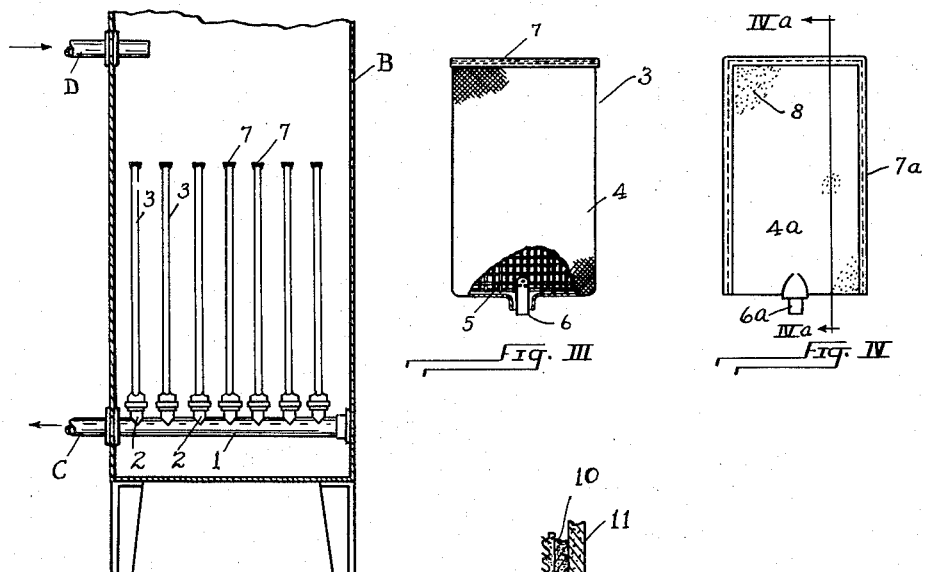
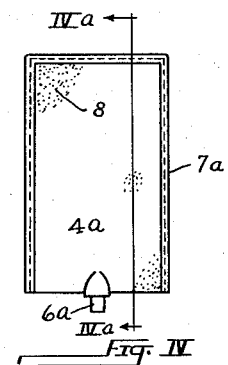
Fig. III
Fig. IV
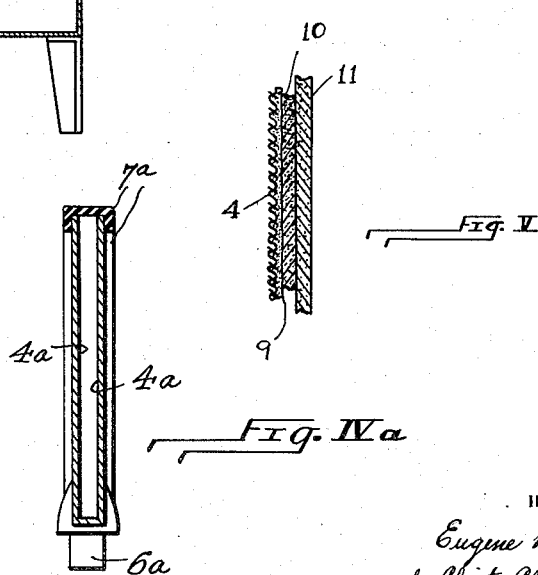
Fig. II
Fig. V
Fig. IVa
INVENTOR
Eugene M. Heckman
by Christy Christy and Wharton
his attorneys Patented May 26, 1936

2,041,763

UNITED STATES PATENT OFFICE 2,041,763

CLEANSING FLUID FILTRATION

Eugene M. Heckman, Pittsburgh, Pa.

Application February 27, 1934, Serial No. 713,097

6 Claims. (Cl. 210—203)

This invention relates to a method of purifying liquids containing finely divided matter in suspension, such as cleansing solvents.

In certain uses and specifically in the cleansing of garments and the like by means of a solvent cleansing fluid, it is customary to establish a cycle in which the solvent is brought in contact with the material to be cleansed and is itself filtered for the removal of dirt carried by it. In such a cyclic operation the solvent is circulated from a filter tank to a work tank in which material, such as fabric, to be cleansed is contained, and from the work tank back to the filter tank. In the filter tank the solvent cleanser must pass through filtering agencies before it can again be circulated to the work tank.

It is usual in such cycle to cleanse the solvent liquid by forcing it through filter bags; and in order to obtain an adequate filtering effect it is usual to introduce into the liquid a powdered material, such as diatomaceous earth, which becomes deposited upon the bag to provide an adequate filtering effect.

The object of my invention is to improve a general filtering process, such as that involved in the cyclic process above noted, by introducing an improved composite filter powder, and causing the deposition of such powder upon the filter bags in an arrangement which gives a filtering medium presenting marked advantages over the filter provided by the use of diatomaceous earth and other filter powders heretofore used.

In the accompanying drawing Fig. I is a side elevation of a typical cyclic cleansing apparatus for use in the cleaning of fabrics and the like; Fig. II is a vertical sectional view through the typical filter tank of the installation shown in Fig. I; Fig. III is a view in elevation showing one of the fabric filter bags used in the filter tank, the bag being shown partly broken away to illustrate its mounting; Figs. IV and IVa show in side elevation and in vertical section respectively, a plate filtering element constituting an equivalent for a filter bag; and Fig. V is a fragmentary sectional view showing the fabric of one side of a filter bag, and the several layers of filter powder and dirt, as condition of the filter bag exists after continuance of the filtering operation for a substantial period of time.

Referring to Fig. I of the drawing, illustrating a typical exemplary cyclic cleansing installation, reference letter "A" designates the work tank of the installation and reference letter "B" the filter tank of the installation. A valved line "C" supplies cleansing fluid to the work tank "A" from the filter tank "B", and a valved line "D" carries cleansing fluid from the work tank to the filter tank. One of the conducting lines, shown as the line "D", from the work tank to the filter tank, is provided with a circulating pump "P".

Circulating line "C" terminates within filter tank "B" in a manifold 1, having thereon a plurality of nipples 2. Mounted on each of the nipples 2 is a filter element designated in Fig. II of the drawing by reference numeral 3. The cleansing liquid, such as carbon tetrachloride, enters the filter tank "B" by way of return line "D", and must be forced under pressure through the walls of the filtering elements 3 in order that it may enter the manifold and be circulated through line "C" to the work tank "A".

Referring to Fig. II of the drawing the filter element consists in a fabric bag, the walls 4 of which are closed at the lower extremity of the bag, and are in mounted position spaced a short distance from each other by a wire screen or lattice 5. At its lower extremity the filter element carries a nipple member 6 arranged to cooperate with the nipple member 2 on the manifold for mounting and connecting the filter bag. Before assembly, the fabric walls 4 are unconnected at the upper extremity of the bag in order that the fabric may be drawn over the frame 5. In assembly of the filter bag its upper extremity is closed by suitable means, such as a split slide ferrule 7 of resilient metal.

In Fig. IV of the drawing the filter element is shown as comprising two plates 4a of a material such as Monel metal, spaced apart a relatively slight distance, and having this space sealed adjacent the edges of the plates by a suitable filler, or luting 7a. The filter element carries a nipple member 6a for mounting on the manifold 1. One or both of plates 4a has throughout its surface openings, or pin-holes, 8 spaced but a slight distance from each other. This gives the effect of a fine mesh screen, and in fact, areas of very fine mesh screen may be used instead of the plates to give the equivalent of a filter bag.

In conducting the method of my invention, with an apparatus similar to that above described, or in any other generally analogous apparatus, I introduce my filter powder into the solvent, or cleansing liquid, such as carbon tetrachloride or refined solvent naphtha, so that it is carried to the filter elements and is brought under pressure against the walls of the filter elements to adhere thereto.

The filter powder which I use comprises primarily two ingredients, one being a hydrated iron oxide, and the other being a vegetable material in a state of fine division, such as wood flour. As the iron compound I may use the naturally occurring hydrated iron oxide responding to the formulæ $Fe_2O_3.7H_2O$ or $Fe_2O_3.(x)H_2O$; or I may use the iron hydroxide $Fe_2(OH)_6$, which latter is a product of manufacture.

The finely divided vegetable material is, as stated, wood flour, which may be roughly defined as wood in a finer condition of division than is produced by the use of a common hand saw. If a fibrous vegetable material other than wood flour, such as cotton seed hulls or the like, be used it should be understood that it should be in an equally finely divided condition. I prefer wood flour of a size to pass through a sixty-mesh screen.

A hydrated iron compound possesses several advantageous features rendering it more suitable for use as a filtering medium than diatomaceous earth, or similar material, for the continuous filtration of cleansing solvents. One advantage is that such iron compounds do not permit the passage of even the slightest trace of moisture, and thus act to thoroughly dehydrate the cleansing solvent. A further advantage is that the iron compound decolorizes the cleansing fluid when filtered through it, giving an amber-colored fluid as compared with a smoked glass color of circulating cleansing fluid which is filtered through diatomaceous earth. A further advantage of the iron compound is that of increased adherence to the filter bags of plates, permitting the use of single coating of iron compounds for from two to three times the period in which diatomaceous earth coatings may be used.

For the above reasons hydrated iron compounds have been widely used in filter beds. It has hitherto, however, proven impossible to use a hydrated iron compound in the filtering of cleansing solvents through filter elements such as those illustrated when the fluid to be filtered is forced through the walls of the filter elements under pressure. This is for the reason that the iron compounds tend to penetrate the walls of the filter elements, and therefore, to be carried with the cleansing solvent to the work. I have found a way of preventing penetration of the iron compounds into and through the walls of the filter elements.

In order to prevent penetration of the iron compounds I mix with the iron compound, or compounds, of the filter powder, the wood flour or its equivalent above noted, grinding the two materials lightly but evenly together. I have found that one part of wood flour to from five to ten parts of the iron compound, by weight, is adequate for my purpose.

During the initial circulation of the cleansing fluid, and before work is introduced into the work tank, I add to the fluid in the work tank a sufficient quantity of the powder to coat the wall area of the filter bags to substantial depth. The wood flour having about $\frac{1}{10}$ the specific gravity of the iron compounds is carried first into the filter tank, and into contact with the walls of the filter elements to which it adheres. The iron compound, or compounds, following the wood flour, are deposited on the walls of the filter elements with a slight initial coating of the wood flour intervening between the iron compound and the actual walls of the filter elements.

Without the presence of the wood flour the iron powder initially passes freely through the walls of, and into, the filter elements when circulation is started, and this passage through the system continues to a marked extent for a period of from three to five minutes. In addition to the loss of time involved, so much iron passes into circulation that it is impossible to be certain that it has been entirely removed from the system, there being throughout the entire operation a tendency existent for the iron to pass through the walls of the filter elements and to be carried to the work tank. This inevitably results in injury to fine fabrics which are being subjected to a cleansing operation. With the inclusion of wood flour, a negligible quantity of iron is returned to the work tank even in the initial seconds of circulation, and no trace of iron can thereafter be found in the filtered solvent returned to the work tank.

Fig. V of the drawing illustrates the deposition of coatings or layers of material on the wall of a filter element, and incidentally illustrates a further advantage of iron compounds over diatomaceous earths for a filtering medium. In this figure of the drawing the coating 9 lying directly against the wall 4 of the filter bag is composed of wood flour. The coating 10 lying next outwardly to the coating of wood flour is composed of one of the iron compounds noted, and the coating 11 is a coating of dirt removed from materials which have been cleansed. It will be noted that, as illustrated, the dirt appears as a coherent layer lying outwardly of the iron compound. This is an accurate illustration of the actual condition which exists, and shows an effect different from that obtained by the use of diatomaceous earth. When one of the diatomaceous earths is used as the filtering medium, there is a tendency for dirt particles to partially penetrate the coating of diatomaceous earth, and to become intermingled with the particles of the filtering medium. This tends to destroy the efficiency of the filtering medium, and also impairs its complete adherence to the filter elements.

While I circulate wood flour, and cause its deposition on the filter elements without reference to any possible filtering effect of the wood flour, it may be noted that, forming as it does a distinct coating or layer, it does not in any way detract from the filtering efficiency, or adhesion, of the iron compound.

It is to be understood that by the term "filter bag," as used in claims appendant hereto, I intend to include any such equivalent structure as the spaced plates shown in Fig. IV of the drawing, or spaced screen members of fine mesh; and by the term "wood flour" I intend to include other equivalent fibrous vegetable materials in an equally fine condition of division. It is also to be understood that the method may be used for the purification of various liquids containing finely divided matter in suspension, other than the carbon tetrachloride and solvent naphtha noted above. The pressure under which the liquid is forced through the filter bags may, if desired, be a negative rather than a positive pressure.

It is of course possible to introduce the wood flour substantially in advance of the iron compounds, but the iron compound or mixture of iron compounds should not be introduced materially in advance of the wood flour, as in such event the iron will tend to be forced through the filter bags before the wood flour can be applied. For this reason it is highly desirable that the two ingredients be mixed in a composite powder, thus avoiding possibility of error in conducting the method.

It may be stated more generally that my invention comprises using, in a circulatory pressure filter, a filter bag or its equivalent having thereon a composite filtering deposit, in which deposit the lighter, and more flocculent, material lies next the filter bag and prevents penetration of the bag by the heavier, and less flocculent, material.

I claim as my invention:

1. The herein described method of filtering liquids containing fine suspended matter which comprises introducing wood flour and at least one powdered hydrated iron compound into a stream of the liquid passing to a liquid penetrable filter bag, the wood flour and the iron compound being relatively so introduced that the substances are selectively deposited in a stratified composite coating on the wall of the filter bag with the wood flour lying between the wall of the filter bag and the layer of iron compound, and forcing the liquid through the composite coating and through the wall of the filter bag.

2. The herein described method of filtering liquids containing fine suspended matter which comprises introducing a composite filtering compound of wood flour and at least one hydrated iron compound into a stream of the liquid passing to a liquid penetrable filter bag, and by difference in the relative specific gravity of the wood flour and the iron compound content of the powder producing on the wall of the filter bag a stratified composite coating of wood flour and iron compound with the wood flour lying between the iron compound and the wall of the filter bag, and forcing the liquid under pressure through the composite coating and through the wall of the filter bag.

3. The herein described method of filtering cleansing liquids in a cyclic cleansing operation which comprises circulating a cleansing liquid between and through a work tank and liquid penetrable filter bags in a filter tank, introducing into the circulation at least one powdered hydrated iron compound and wood flour, the iron and wood flour being so introduced that the wood flour comes in contact with the wall of the filter bag before the iron compound, producing on the wall of the filter bag under the pressure of circulation a stratified composite coating with the wood flour lying between the iron compound and the wall of the filter bag, and continuing circulation while forcing the cleansing liquid through the composite coating and through the wall of the filter bag.

4. The herein described method of filtering liquids containing fine suspended matter which comprises preparing a filter element by applying to the wall of a liquid penetrable filter bag a stop coating of wood flour, applying a coating of at least one hydrated iron compound to the filter bag outwardly of the stop coating of wood flour thereon, and forcing the liquid to be filtered through the composite coating so formed and through the wall of the filter bag.

5. The herein described method of filtering liquids containing fine suspended matter which comprises introducing wood flour into a flowing stream of the liquid passing to a liquid penetrable filter bag to form a coating on a wall of the bag, introducing a hydrated iron compound as a less flocculent filtering and clarifying material in a finely divided condition and having in such condition a penetrating quality greater than that of the wood flour into the stream of liquid flowing to the filter bag at a time to reach the bag after the formation of a stop coating of the wood flour thereon, thereby producing on the wall of the filter bag a composite coating with the wood flour lying between the wall of the filter bag and the less flocculent filtering and clarifying material, and forcing the liquid to be freed of suspended matter through the composite coating and through the wall of the filter bag.

6. The herein described method of filtering liquids containing fine suspended matter which comprises applying on a wall of a liquid penetrable filter bag a preliminary stop coating of a light flocculent material to prevent penetration of the filter bag by an additional and major filtering and clarifying agent, said light flocculent material forming on the bag a coating layer permeable by liquids and substantially impermeable by a denser and less flocculent material divided into appreciable physical particles, later applying to the filter bag in addition a hydrated iron compound as a major filtering and clarifying material of denser and less flocculent nature than the material of the stop coat, said additional filtering medium being divided into fine but appreciable physical particles to form a major filtering coat separated from the wall of the filter bag by the more flocculent stop coat, and forcing the liquid to be freed of suspended matter through the composite coating and through the wall of the filter bag.

EUGENE M. HECKMAN.